US005617933A

United States Patent [19]
Ericson

[11] Patent Number: 5,617,933
[45] Date of Patent: Apr. 8, 1997

[54] BI-DIRECTIONAL ELEVATOR GOVERNOR

[75] Inventor: Richard J. Ericson, Southington, Conn.

[73] Assignee: Otis Elevator Company, Farmington, Conn.

[21] Appl. No.: 489,874

[22] Filed: Jun. 13, 1995

[51] Int. Cl.⁶ ........................................... B66B 5/00
[52] U.S. Cl. ........................................ 187/350; 188/188
[58] Field of Search ................................ 187/350, 373, 187/374; 188/188, 189

[56] References Cited

U.S. PATENT DOCUMENTS

| | | | |
|---|---|---|---|
| 1,298,066 | 3/1919 | Lindquist | 187/350 |
| 2,001,361 | 5/1935 | Hymans | 187/80 |
| 5,183,978 | 2/1993 | Sheridan et al. | 187/105 |
| 5,183,979 | 2/1993 | Sheridan et al. | 187/108 |
| 5,299,661 | 4/1994 | Pramanik et al. | 187/89 |

FOREIGN PATENT DOCUMENTS

| | | |
|---|---|---|
| 669675 | 11/1929 | France . |
| 416361 | 10/1990 | France . |
| 418260 | 5/1923 | Germany . |
| 490744 | 12/1972 | U.S.S.R. . |

Primary Examiner—Kenneth Noland

[57] ABSTRACT

An elevator governor rope brake assembly is disclosed for slowing governor rope movement upon the occurrence of unintended movement of an elevator cab. The assembly comprising a governor sheave over which a governor rope passes, with a pivotally mounted brake disposed about its outer circumference on a pivot arm for slowing the governor rope movement. The pivotally mounted brake being capable of pivoting along a clockwise and counter-clockwise arcuate path, each of the arcuate paths intersecting the outer circumference of the governor sheave at symmetrical locations at an angle sufficient for the pivotally mounted brake to engage the governor rope with sufficient force to slow the governor rope movement. Spring loaded releasing detents are used for initially positioning the pivotally mounted brake vertically. Flyweights on the governor sheave actuate the detents and release the pivotally mounted brake from the initial vertical position upon the occurrence of unintended movement of the elevator cab. The flyweights also provide a force to the pivotally mounted brake in a direction consistent with the governor rope's movement, thereby urging the pivotally mounted brake to arc in the desired braking direction.

5 Claims, 4 Drawing Sheets

BI-DIRECTIONAL ELEVATOR GOVERNOR

TECHNICAL FIELD

The present invention relates generally to elevator safety systems, and more particularly, to a bi-directional governor rope brake assembly for use as part of an elevator safety system.

BACKGROUND OF THE INVENTION

Elevator Systems

A typical elevator system comprises a rotatably mounted drive sheave supporting a hoist rope, where one end of the hoist rope suspends an elevator cab, and the other end of the hoist rope suspends a counterweight. Upon rotation of the drive sheave, the elevator cab and counterweight translate vertically in opposite directions. The counterweight typically has a weight equal to the weight of the elevator cab plus 42.5 to 50 percent of the rated load capacity (i.e. passengers and cargo) of the elevator system.

Passenger safety plays an important role in the design of elevator systems. Many safety systems have been designed to prevent unintended descent of an elevator cab within an elevator hoistway. This unintended descent may be due to power or mechanical failure within the elevator system, and in some cases, may be due to the severing of ropes that hoist the elevator cab. It is known that without an elevator safety system, unintended descent of an elevator cab may lead to passenger injuries and damage to the elevator cab and hoistway.

Safety Systems

As part of these safety systems, the elevator cab itself is equipped with braking devices known as safeties. Typically, safeties use a roller, clamp, or wedge to apply frictional pressure to the guide rails on each side of the hoistway. Upon activation, the safeties bring the elevator to a quick, safe stop.

It is well known that a governor assembly may be used to assist in the activation of the elevator's safeties. A typical elevator safety system utilizing a governor assembly comprises, in part, a governor sheave rotatably mounted in the elevator hoistway adjacent to the drive sheave, and suspending a governor rope in tension with the aid of a rotatably mounted tension sheave at the bottom of the hoistway. The governor sheave itself is part of the governor assembly, which when activated, slows the rotational speed of the governor sheave, and consequently the vertical speed of the governor rope.

The ability of the governor assembly to slow the vertical speed of the governor rope is then used to activate the elevator's safeties through the connection of the elevator safeties to the governor rope through a system of lift rods, linkages, and a safety operating lever. The safety operating lever is pivotally mounted to the elevator car frame and contains a clamp that extend away from the elevator cab and is clamped to the governor rope. The pivoting of the safety operating lever actuates a series of linkages, which in turn, actuates lift rods attached to the elevator's safeties. The actuation of the lift rods engages the elevator's safeties, thereby applying frictional pressure to the guide rails on each side of the hoistway. The actuation of the safeties, and the operation of the entire elevator safety system, can be further described by way of illustration.

When the elevator system is in operation, the rotation of the drive sheave causes the elevator cab to travel within the hoistway. Since the governor rope is attached to the elevator cab through the safety operating lever, it travels at the same speed as the elevator cab. Should the elevator cab, and thereby the governor rope, travel at an unintended speed or travel during an unintended time, the governor system would activate, causing the speed of the governor rope to decrease. Since the elevator cab is traveling at its original speed, and since the governor rope is now traveling at a slower speed, the safety operating lever is forced to pivot, thereby activating the elevator's safeties through the aforementioned linkages and lift rods.

Governor Assemblies

The prior art discloses two major types of governor assemblies used today in elevator safety systems for rapid descent of an elevator cab. These two governor assemblies are known as the swinging-jaw governor and the pivoting-jaw governor.

The swinging-jaw governor utilizes a stationary jaw and a swinging jaw each mounted at opposite sides of the governor rope, which when activated, sandwich the governor rope between them to slow the rope speed through friction. The swinging jaw is pivotally mounted to the governor housing with a plurality of links, wherein the length of the links, combined with the width of the jaw, necessitates that the swinging jaw be pivoted upward to prevent contact between the jaw and the governor rope. The swinging jaw is then held in this position with a latch.

The activation of this "sandwich" effect involves a multi-step process. Flyweight are disposed along the surface of the governor sheave, which extend outward beyond the sheave's circumference upon the sheave reaching a predetermined rotational speed. When these flyweights extent outward, they come into contact with a tripping assembly, thereby actuating the latch supporting the swinging jaw. When the latch is actuated, it drops the swinging jaw through gravity. The geometry of the jaw and link assembly dictates that as the swinging jaw drops, the gripping edge of the jaw translates horizontally until it comes into contact with the governor rope. When the swinging jaw drops to a point where the links are in a horizontal orientation, the result is that the gripping edge of the jaw is in its fully translated position. At this position, the swinging jaw is pressing the governor rope against the stationary jaw located on the opposite side of the rope, thereby causing a frictional force sufficient to slow the speed of the rope.

The prior art also discloses an improvement on the swinging-jaw governor wherein two swinging jaw are used, one on each end of the sheave. The purpose of using two swinging jaws is to slow the governor rope no matter which direction the sheave is rotating. It is important however that the flyweights and tripping assembly be modified in order to release the latch of the appropriate swinging jaw when the sheave rotates in either direction.

The other type of governor found in the prior art today for use in elevator safety systems is the pivoting-jaw governor. This type of governor uses a jaw fastened to a pivoting arm which is pivotally mounted to the governor housing. The gripping portion of the jaw is positioned at a location beyond the circumference of the governor sheave, and below the upper plane of the governor sheave. The pivoting point of the jaw's pivoting arm is positioned so that when the jaw arcs toward the sheave, it will come into contact with the sheave's circumference.

As with the swinging-jaw governor, the pivoting-jaw governor uses flyweights to activate the system. When the flyweights extend outward, they activate a clutch, causing the pivoting-jaw to pivot in the direction of the sheave rotation. As the jaw arcs toward the sheave, it comes into contact with the governor rope causing frictional forces between the jaw and the rope, thereby slowing the rope speed.

Unintended Ascent

Another safety concern in elevator systems is unintended ascent of an elevator cab. Unintended ascent may occur when the weight of the elevator cab plus its load weight is less than the weight of the counterweight. In case of mechanical or electrical failure, it may be possible for the elevator cab to unintendedly ascend, which may also result in passenger injuries, and damage to the elevator cab and hoistway. Many elevator safety systems do not address the safety concerns involved in the unintended ascent of elevator cabs.

The single swinging-jaw governor and the pivoting-jaw governor are specifically designed to slow ropes that are traveling in a direction consistent with the downward movement of an elevator cab. If an elevator cab ascends at a rapid speed, these governors would be unable to slow the rope speed, and consequently, would not be able to activate the elevator's safeties.

Specifically, the design of the swinging-jaw governor is such that it would be readily apparent to one skilled in the art of elevator governors that it can only operate when the sheave rotates in one direction. If the sheave rotates at an excessive speed in a direction that causes the portion of the governor rope located between the two jaws to travel in a direction opposite of the swinging arc of the swinging jaw, then the swinging jaw can never drop down properly. This is due to the fact that the upward frictional forces between the governor rope and the swinging jaw will overcome the gravitational forces on the jaw and prevent the jaw from dropping into position. If the swinging jaw does not drop into position, there will not be sufficient force on the rope to slow its speed.

Similarly, the structure of the pivoting-jaw governor is designed for operation when the sheave is rotating in one direction only. If the pivot arm is mounted so that it operates properly in one direction, then pivoting the arm in the opposite direction will result in a pivoting arc that moves the jaw away from the circumference of the governor sheave. Since no contact will occur between the jaw and the governor sheave, no force can be exerted on the governor rope in order to slow the rope down. Therefore, since the design of the pivoting-jaw governor is based on affecting the rotation of the sheave that corresponds to a descending elevator cab, this type of governor would not function properly in a system designed to prevent rapid ascent of an elevator cab.

DISCLOSURE OF THE INVENTION

It is accordingly one object of the present invention to provide an elevator safety system that can prevent unintended ascent and descent of an elevator cab.

Another object of the present invention is to provide an elevator safety system that utilizes a bi-directional governor brake assembly that can slow governor rope speed no matter which direction the governor rope is traveling.

Still another object of the present invention is to provide an elevator safety system that utilizes a bi-directional governor brake assembly capable of operating at high rope speeds.

Another object of the present invention is to provide a bi-directional governor brake assembly that utilizes a low mass rope jaw.

Another object of the present invention is to provide a bi-directional governor brake assembly that comprises a minimal number of moving parts.

Yet another object of the present invention is to provide a bi-directional governor brake assembly that is inexpensive to manufacture.

These objects in an elevator system are achieved in an elevator governor rope brake assembly for slowing governor rope movement upon the occurrence of unintended movement of an elevator cab. The assembly comprises a governor sheave over which the governor rope passes, the governor sheave having an outer circumference and adapted to rotate about a first axis.

Pivotally mounted braking means are disposed about the outer circumference of the governor sheave for slowing the governor rope movement, the pivotally mounted braking means capable of pivoting along a first arcuate path and a second arcuate path, the first arcuate path and second arcuate path intersecting the outer circumference of the governor sheave at symmetrical locations on the outer circumference. The intersecting of the first arcuate path and the second arcuate path with the outer circumference of the governor sheave occurring at an angle sufficient for the pivotally mounted braking means to engage the governor rope with sufficient force to slow the governor rope movement no matter which direction the governor rope is traveling. The pivotally mounted braking means being able to function as part of a bi-directional elevator safety system preventing both unintended descent and ascent of an elevator cab.

Releasable positioning means are disposed about the pivotally mounted braking means for initially positioning the pivotally mounted braking means at a point where the first arcuate path and the second arcuate path intersect. Actuating means are provided for actuating the releasable positioning means and releasing the pivotally mounted braking means from the initial position, the actuating occurring upon the unintended movement of the elevator cab, wherein the actuating means also provides a force to the pivotally mounted braking means in a direction consistent with the governor rope's movement. Upon actuation of the releasable positioning means and the application of a force in a first direction, the pivotally mounted braking means will arc along the first arcuate path. Upon actuation of the releasable positioning means and the application of a force in a second direction, the pivotally mounted braking means will arc along the second arcuate path.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 2:
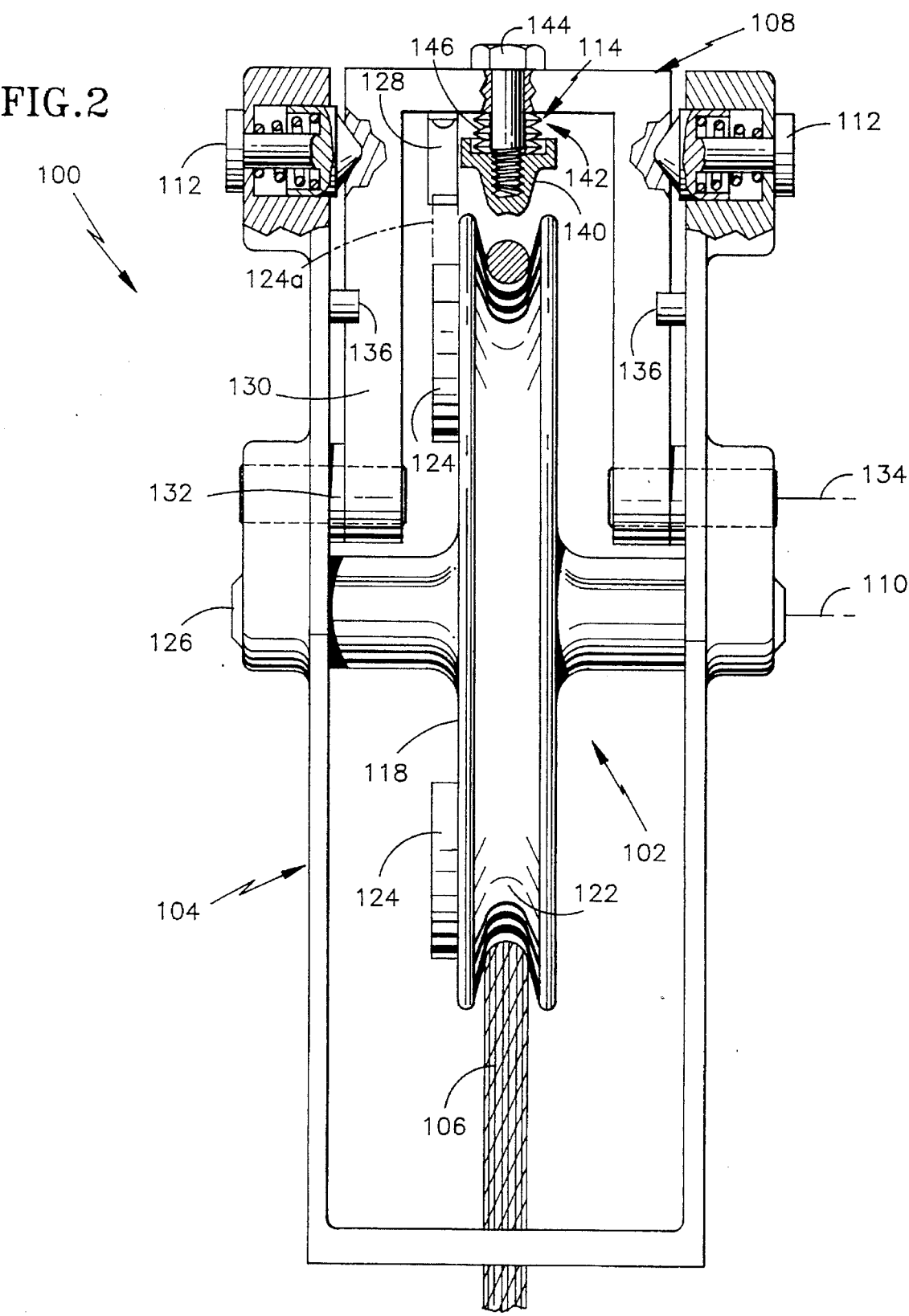
FIG. 2 is a front view, partly broken-away and partly in section, of the bi-directional governor brake assembly of FIG. 1.
Figure 4:
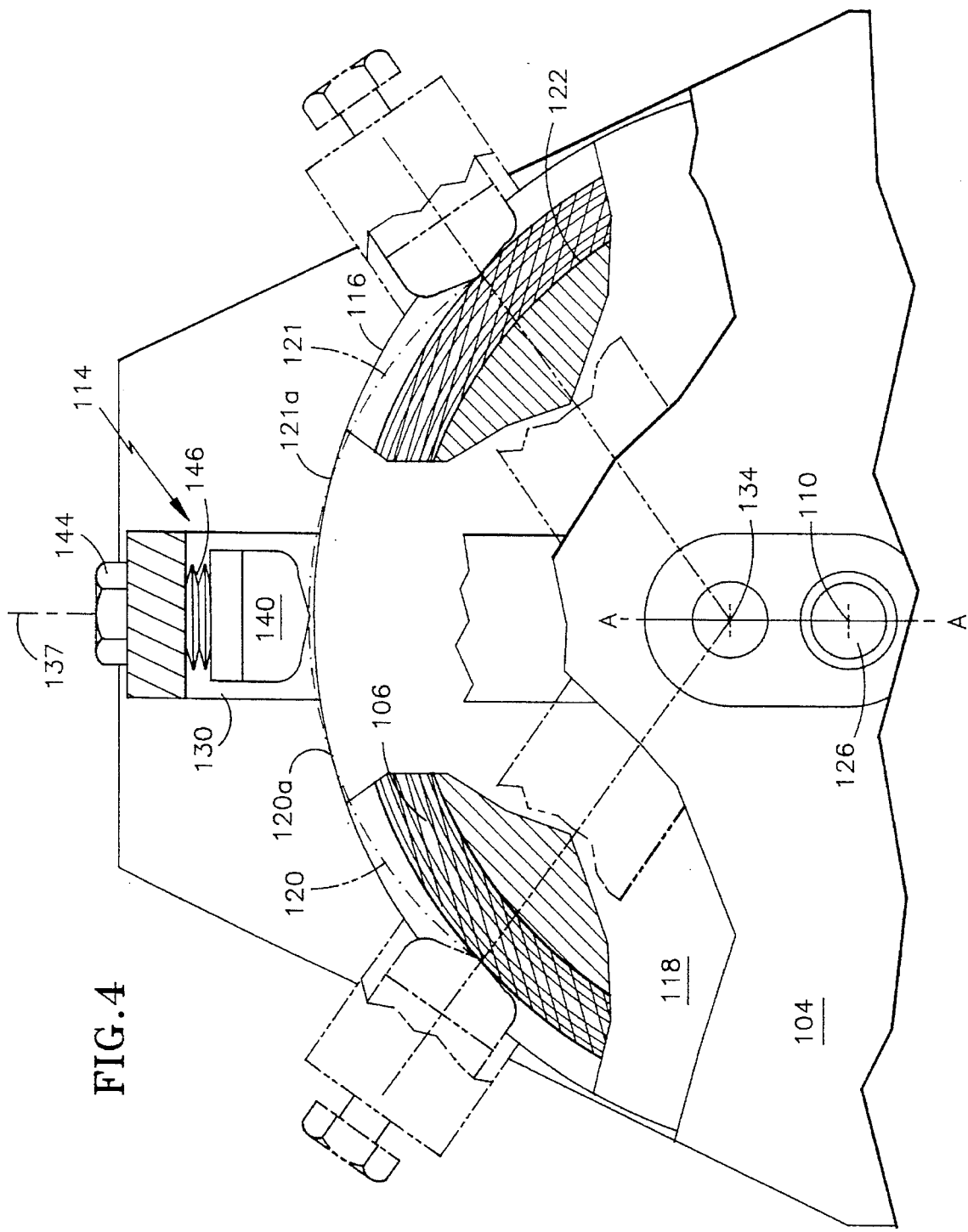
FIG. 4 is a side view, partly broken-away and partly in section, of the bi-directional governor brake assembly of FIG. 1, showing the arcing path of the pivotally mounted brake.
Figure 4A:
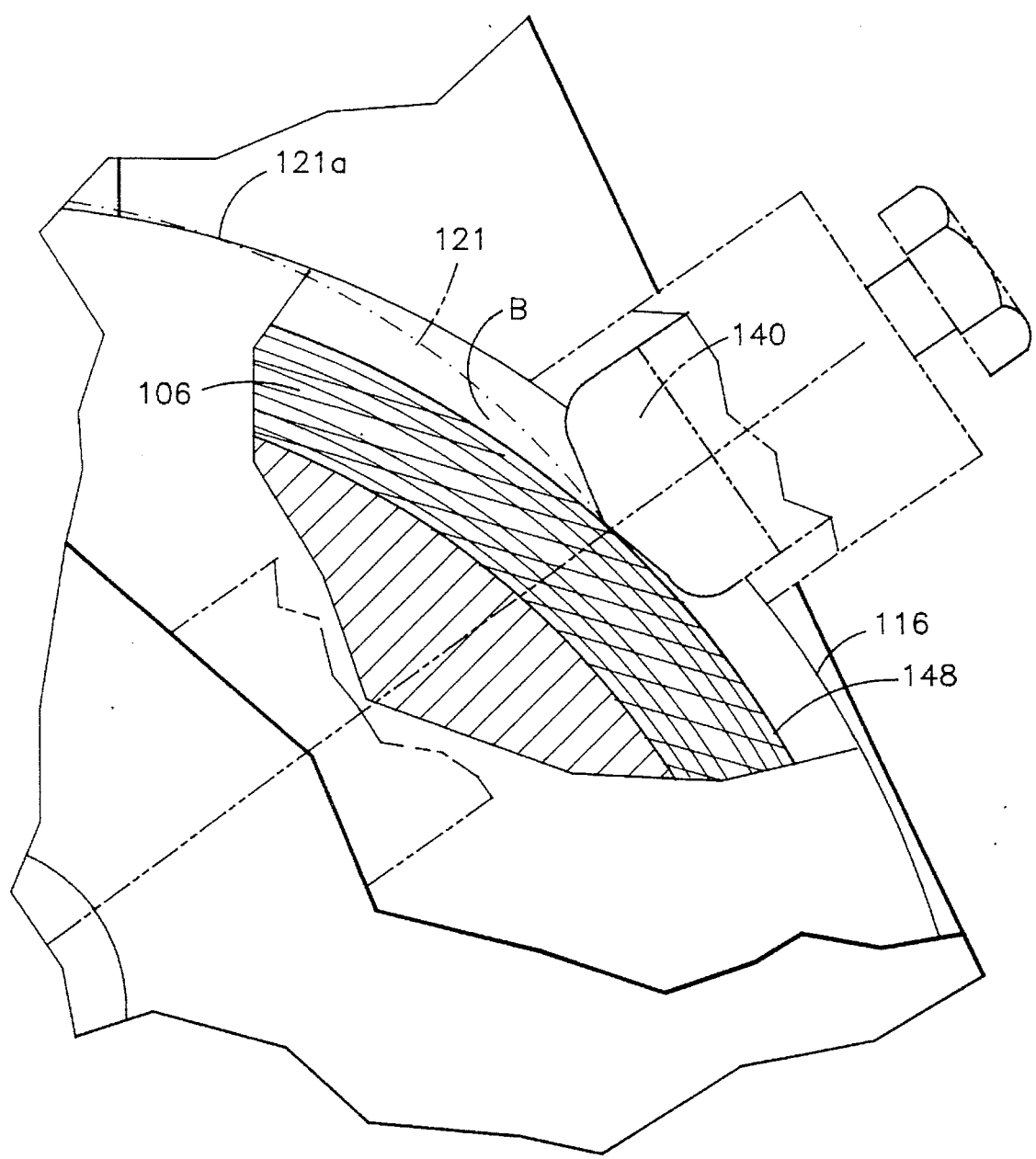
FIG. 4A is a magnification of a portion of FIG. 4, depicting in detail a right-side contact point between the pivotally mounted brake and the governor rope.

An embodiment of an elevator bi-directional governor brake assembly 100 (hereinafter governor assembly) employing the concepts of the present invention is illustrated in FIG. 2. In the governor assembly 100, a sheave assembly 102 is rotatably mounted within a housing 104 and supports a governor rope 106. A pivot arm assembly 108 is pivotally mounted to the housing 104 at a point above the rotation axis 110 of the sheave assembly 102. The pivot arm assembly 108 is initially held in a substantially vertical position through the use of spring loaded releasing detents 112. As depicted in FIGS. 2 and 4, a brake assembly 114 is fastened to the upper portion of the pivot arm assembly 108, and is capable of pivoting along symmetrical arcuate paths 120, 121 that intersect the circumferential edge 116 of the sheave 118 at symmetrical locations 120a, 121a.

The major portions of the governor assembly 100 include the sheave assembly 102, the pivot arm assembly 108, and the brake assembly 114.

The Governor Sheave Assembly

Referring to FIGS. 2 and 4, the sheave assembly 102 comprises a sheave 118 mounted for rotation about a shaft 126 fixed to the housing 104. The sheave 118 contains a recess 122 about its circumferential edge 116 of sufficient width and depth to receive the upper loop of the governor rope 106.

In a preferred embodiment of the present invention, two flyweights 124 are disposed at substantially opposite ends of one side of the sheave 118. As is known in the art, flyweights 124 are rotatably mounted to the sheave 118, and are capable of rotating outward to a deployed position 124a upon the sheave assembly 102 rotating at a predetermined speed. In the deployed position 124a, the non-rotatably mounted ends of the flyweights 124 extend radially outward beyond the circumferential edge 116 of the sheave 118. In a preferred embodiment, the flyweights 124 are of sufficient length to make contact with a pivot arm contact point 128 when the flyweights 124 are in their deployed position 124a. In addition, the flyweights 124 must be able to deploy no matter which direction the sheave assembly 102 is rotating.

In alternative embodiments of the present invention, the flyweights 124 may be secured to each other with linkages, rods, members, or other means of connecting the flyweights to each other as is known in the art to allow the flyweights 124 to deploy upon rotation of the sheave 118 in either direction. In such an embodiment, each of the flyweights 124 would deploy equally, and conversely, would retract at the same time.

In addition, alternative embodiments of the present invention may use spring or elastomer means to hold the flyweights 124 in a retracted position until the sheave assembly 102 reaches a predetermined rotational speed. These spring or elastomer means may be integrated into the aforementioned means of connecting the flyweights to each other in order to keep both flyweights in a retracted position until they both deploy simultaneously at the predetermined speed.

The present invention is not limited to the use of only two flyweights 124. The number of flyweights 124 may be increased or decreased and still ensure the proper function of the present invention.

The Pivot Arm Assembly

Referring to FIGS. 2, 3, 4, and 4A, the pivot arm assembly 108 comprises a pivot arm 130, a pivot arm contact point 128, a brake assembly 114 and a spring loaded fastener 142 for fastening the brake assembly 114 to the pivot arm 130. In a preferred embodiment of the present invention, a U-shaped pivot arm 130 is pivotally mounted to the housing 104 at pivot points 132. The pivot points 132 are situated as to create an axis of rotation 134 for the pivot arm 130 that is above the sheave axis of rotation 110. As depicted in FIG. 4, the pivot arm axis of rotation 134 is vertically aligned along line A—A with the sheave axis of rotation 110. This vertical alignment along line A—A ensures the initial alignment of the pivot arm 130 with the vertical centerline of the sheave 136. The pivot points 132 may utilize bearing means, bolt assemblies, or any means for rotatably mounting the pivot arm 130 to the housing 104. It is preferred that the pivot points 132 employ a rotatable mount that requires minimal maintenance and allows the smooth pivoting of the pivot arm 130 in both a clockwise and counter-clockwise direction.

Figure 1:
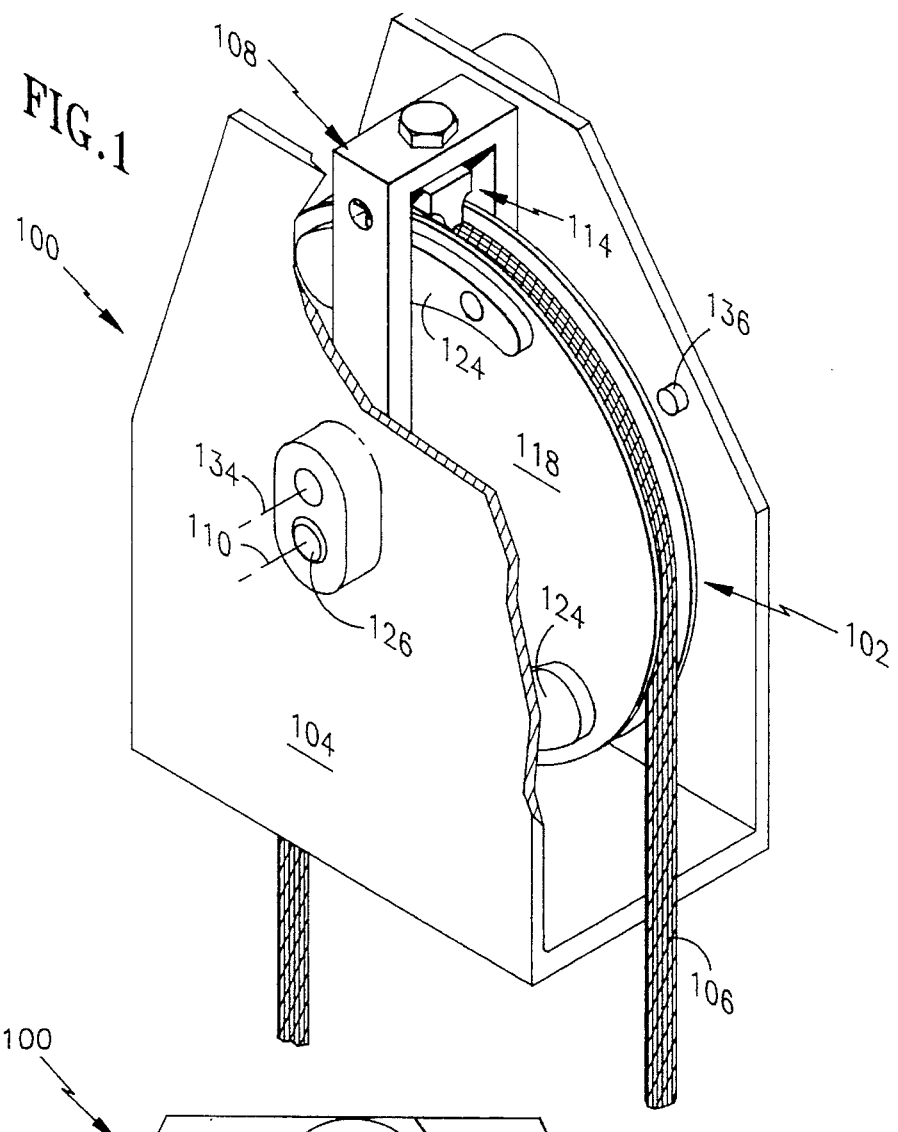
FIG. 1 is a perspective view, partly broken-away and partly in section, of the bi-directional governor brake assembly of the present invention.
Figure 3:
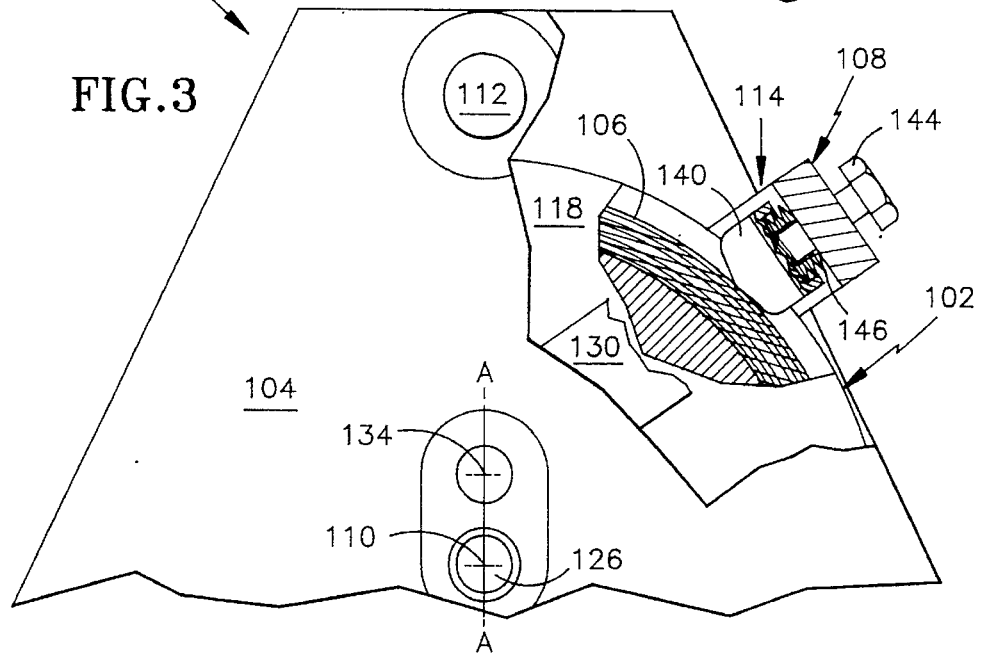
FIG. 3 is a side view, partly broken-away and partly in section, of the bi-directional governor brake assembly of FIG. 1, showing the pivotally mounted brake in contact with the governor rope.

The brake assembly 114 is attached to a portion of the pivot arm 130 distal from the pivot arm axis of rotation 134, placing the brake assembly 114 above the recess 122 about the circumferential edge 116 of the sheave 118. The higher location of the pivot arm axis of rotation 134 with respect to the sheave axis of rotation 110 allows the brake assembly 114 to pivot about a first arcuate path 120 that intersects with the left side of the outer circumference 116 of the sheave 118 at left side intersecting point 120a, and a second arcuate path 121 that intersects with the right side of the circumference of the sheave 118 at a right side intersecting point 121a. As depicted in FIG. 3, the brake assembly 114 can arc along either of these arcuate paths 120, 121 and subsequently engage the governor rope 106 sitting in the recess 122 about the outer circumference 116 of the sheave 118. In a preferred embodiment of the present invention, the brake assembly 114 engages the governor rope 106 at an engagement angle B of five degrees. This engagement angle B is calculated to allow the brake assembly 114 to grip the governor rope 106 with sufficient force to slow the governor rope 116 speed while simultaneously pivoting the pivot arm 130 until it comes into contact with stops 136 attached to the housing 104. Due to the initial vertical alignment of the pivot arm 130, the engagement angle B is the same when the pivot arm 130 pivots in both a clockwise or counter-clockwise direction.

The engagement angle B may vary based on various factors including, but not limited to, the diameter of the sheave 118, the vertical location of the pivot arm axis of rotation 134, the distance between the pivot points 132 and the brake assembly 114, the size, shape, weight, and composition of the brake assembly 114, the rotational speed of the sheave assembly 102, the composition of the governor rope 106, the coefficient of friction between the rope jaw 140 and the governor rope 106, and the arcing speed of the pivot arm 130. Based on these and similar factors, in alternative embodiments, the engagement angle B may be more or less than the preferred five degrees. The engagement angle B should not be so steep or shallow as to prevent the brake assembly 114 from sufficiently gripping the governor rope 106 with enough frictional force to slow the governor rope 106 while simultaneously pivoting the brake assembly 114 and consequently the pivot arm 130 until it comes into contact with the stops 136.

The pivot arm contact point 128 provides a contact surface on the pivot arm 130 for the flyweights 124 on the sheave 118 to strike when they are deployed. In a preferred embodiment, the pivot arm contact point 128 comprises a thin sheet of steel attached to the pivot arm on the same side of the sheave 118 as the flyweights 124, and positioned so that the deployed flyweights 124a will make contact with it. This sheet of metal should have a thickness sufficient to transfer some of the impact force of the striking deployed flyweights 124a to the pivot arm 130, and yet flexible enough to flex and allow the deployed flyweights 124a to pass the pivot arm 130 after striking the pivot arm contact point 128. If the pivot arm contact point 128 was not flexible, the resulting impact between the deployed flyweights 124a and a rigid pivot arm contact point 128 could cause damage to the governor assembly 100.

In alternative embodiments of the present invention, the pivot arm contact point 128 may comprise a material other than steel, may take on a variety of shapes and sizes, may occupy different locations on the pivot arm 130, and may be rigidly fastened or fastened to the pivot arm 130 with spring-like fasteners.

Brake Assembly

In an embodiment of the present invention, the brake assembly 114 comprises a rope jaw 140 fastened to the pivot arm 130 with spring loaded fasteners 142. In a preferred embodiment of the present invention, the spring loaded fasteners 142 further comprise a partially threaded bolt 144 and a plurality of belleville washers 146. The partially threaded bolt 144 contains threads on the portion of the bolt distal from the head of the bolt, and does not contain threads on the portion of the bolt proximal to the head of the bolt.

To form the brake assembly 114, the partially threaded bolt 144 is placed through a bore at the mid-point of the horizontal portion of the pivot arm 130. The partially threaded bolt 144 should have an unthreaded portion length equal to the thickness of the horizontal portion of the pivot arm 130 plus the total width of the selected number of belleville washers 146. The threaded portion of the partially threaded bolt 144 is threaded into a female threaded opening in the rope jaw 140.

In a preferred embodiment of the present invention, belleville washers 146 are used with the partially threaded bolt 144 as the spring loaded fasteners 142. The size and number of belleville washers that are necessary will depend on the forces. The number, size, and compressive strengths of the belleville washers 146 may depend on factors similar to the factors listed above in determining the engagement angle B. In yet other embodiments of the present invention, springs, elastomer material, or any combination of spring-like assemblies and resilient materials may be used as a substitute for the belleville washer 146 and partially threaded bolt 144 assembly.

In addition, it is preferred that the rope jaw 140 be manufactured from a metallic material. However, in other embodiments, the rope jaw 140 may be manufactured from any material that is capable of providing the necessary frictional forces and wear resistance for slowing the governor rope 106 speed.

Governor Assembly Operation

During operation, the governor rope 106 is clamped by a safety operating lever (not shown) which causes the loop of governor rope 106 to rotate clockwise or counterclockwise depending on the side of the governor rope loop clamped by the safety operating lever and the direction the elevator cab is traveling. The combination of the governor rope sitting in the recess 122 about the circumferential edge 116 of the sheave 118, and the tension supplied to the governor rope loop through a tension sheave (not shown), causes the sheave 118 to rotate in the same direction as the rotation of the governor rope loop. In a preferred embodiment of the present invention, downward movement of an elevator cab will cause the sheave assembly 102 to rotate in a clockwise direction, while an upward movement of an elevator cab will cause the governor sheave assembly to rotate in a counter-clockwise direction.

If an elevator cab descends within the hoistway, the sheave 102 rotates clockwise at a rotational speed proportional to the vertical speed of the elevator cab. To trigger the governor braking system at the appropriate time, the flyweights 124 are calibrated to deploy at a predetermined rotational speed of the governor assembly 102. When this predetermined rotational speed is reached, the flyweights 124 deploy into their deployed position 124a extending radially outward beyond the circumferential edge 116 of the sheave 118. The length of the deployed flyweight 124a is such that the deployed flyweight 124a will make contact with the pivot arm 130 at a pivot arm contact point 128.

Initially, in a preferred embodiment, the pivot arm 130 is held in a vertical position with the aid of spring loaded releasing detents 112 positioned between the housing 104 and both sides of the pivot arm 130. These detents 112 have spring loading compressive strengths that are capable of holding the pivot arm 130 in vertical orientation during normal operation of the elevator system. However, these detents 112 are calibrated so that they will disengage the pivot arm 130 upon the application of a predetermined impact force by the deployed flyweights 124a. In alternative embodiments, the number, and position, of the detents 112 may be adjusted and still provide the necessary positioning for the pivot arm 130. In addition, other types of releasable positioning means may be used in lieu of the detents 112. These may include latching mechanisms, electronic or magnetic securing means, or breakaway fasteners.

If the governor sheave assembly 102 is rotating at an unintended speed in a clockwise direction, the flyweights 124 will deploy into a deployed position 124a and strike the left side of the pivot arm 130 at the pivot arm contact point 128. Upon striking the pivot arm contact point 128, the spring loading in the detents 112 will compress, thereby releasing the pivot arm 130 from its initial vertical position. The striking of the deployed flyweights 124a with the left side of the pivot arm 130 also provides a force to the pivot arm 130 urging it to arc clockwise along the right side pivot arm arcuate path 121. The traversing of the pivot arm 130 along this arcuate path 121 is aided by gravity and the resulting inertia generated by the pivot arm 130 and the brake assembly 114 as the pivot arm 130 arcs away from the initial vertical position. This is distinguished from the prior art pivoting-arm governor where the inertia of the pivot arm and the brake assembly worked against the proper engagement of the rope jaw with the governor rope.

Since the axis of rotation of the pivot arm 134 is located above the sheave axis of rotation 110, and since the distance between the pivot arm axis of rotation 134 and the rope jaw 140 is less than the radius of the sheave 118, then the right side arcuate path 121 that the rope jaw 140 traverses will intersect the outer circumference 116 of the sheave 118 at a right side intersection point 121a. Noting that the governor rope 106 sits in the recess 122 about the outer circumference 116 of the sheave 118, the arcing rope jaw 140 next comes into contact with the governor rope 106 at a shallow engagement angle B.

Upon coming into contact with the governor rope 106, the rope jaw 140 is prevented from arcing along the right side pivot arm arcuate path 121 by the geometry dictated by the governor rope 106 sitting in the recess 122 along the outer circumference 116 of the sheave 118. The inertia of the rope jaw 140 plus the frictional forces generated between the rope jaw 140 and the governor rope 106 diverts the rope jaw 140 from the right side pivot arm arcuate path 121 and forces it to traverse along an arcuate path 148 defined by the outer surface of the governor rope 106 as it is shaped while sitting in the sheave recess 122.

As depicted in FIG. 3, the radial distance between the pivot arm axis of rotation 134 and the rope jaw 140 is less than the distance that is needed for the rope jaw 140 to traverse the governor rope arcuate path 148, thereby forcing the rope jaw 140 radially outward on the pivot arm 130 and causing the belleville washers 146 to compress due to the constraint applied by the horizontal portion of the pivot arm 130. This radially outward movement of the rope jaw 140 coupled with the constraints imposed by the horizontal portion of the pivot arm 130 and the restoration forces applied by the belleville washers 146 to the rope jaw 140 results in additional frictional forces applied by the rope jaw 140 to the governor rope 106. The magnitude of these frictional forces peaks when the pivot arm hits the stops 136, which correspond to a clockwise arcing angle of approximately 90 degrees from the pivot arm's 130 initial vertical position.

The frictional forces applied by the rope jaw 140 to the governor rope 106 must be sufficient to slow the governor rope 106 movement enough to pivot the safety operating lever on the elevator cab and thereby actuating the elevator's safeties.

If the elevator car is moving in an upward direction causing the sheave assembly 102 to rotate in a counter-clockwise direction, the governor assembly 100 operates in a similar fashion as described for the clockwise rotation of the sheave assembly 102. However, the deployed flyweights 124a will strike the right side of the pivot arm 130, thereby causing the pivot arm 130 to arc counter-clockwise along the left side pivot arm arcuate path 120 and intersecting the outer circumference 116 of the sheave 118 at a left side intersection point 120a.

The bi-directional governor brake assembly 100 is designed to operate within a bi-directional elevator safety system that can prevent unintended ascent or descent of an elevator car. In order for this system to operate properly, the safety operating lever, linkages, lift rods and safeties on the elevator cab have to be able to actuate and slow the elevator car upon a slowing of the governor rope speed in either direction.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein.

In alternative embodiments of the present invention, the pivotally mounted braking means is not limited to the pivoting arm 130 arrangement of the preferred embodiment. In other embodiments, the pivotally mounted braking means may be suspended from above the sheave 118 and could arc along the arcuate paths 120, 121 through a track, freefall, or swinging assembly.

Alternative embodiments of the present invention could use an actuator other than the flyweights 124 disclosed in the preferred embodiment. Other means for actuating the releasable positioner may include mechanical tripping assemblies, electronic or magnetic means for sensing the rotational speed of the sheave 118 and actuating the releasable positioner, or electro-mechanical assemblies for achieving the same. The actuator could be disposed about the sheave 118, housing 104, governor rope 106, or at any location in an elevator system where the movement of an elevator cab may be detected.

Additionally, in alternative embodiments the actuator could be devised to engage not only at predetermined speeds of the elevator cab, but also at times when it would be unsafe for the elevator cab to travel within the hoistway (e.g. when the elevator doors are open).

It is intended that the protection granted hereon be limited only by the definition contained in the appended claims and equivalents thereof.

Various changes to the above description may be made without departing from the spirit and scope of the present invention as would be obvious to one of ordinary skill in the art of the present invention.

What is claimed is:

1. In an elevator system, an elevator governor rope brake assembly for slowing governor rope movement upon the occurrence of unintended movement of an elevator cab, said assembly comprising:

(a) a governor sheave over which said governor rope passes, said governor sheave having an outer circumference and adapted to rotate about a first axis;

(b) pivotally mounted braking means disposed about said outer circumference of said governor sheave for slowing said governor rope movement, said pivotally mounted braking means capable of pivoting along a first arcuate path and a second arcuate path, said first arcuate path and second arcuate path intersecting said outer circumference of said governor sheave at symmetrical locations on said outer circumference, said intersecting of said first arcuate path and said second arcuate path with said outer circumference of said governor sheave occurring at an angle sufficient for said pivotally mounted braking means to engage said governor rope with sufficient force to slow said governor rope movement; and (c) releasable positioning means for initially positioning said pivotally mounted braking means at a point where said first arcuate path and said second arcuate path intersect.

2. An elevator governor rope brake assembly, as claimed in claim 1, further comprising:

actuating means for actuating said releasable positioning means and releasing said pivotally mounted braking means from said initial position, said actuating occurring upon said unintended movement of said elevator cab, wherein said actuating means also provides a force to said pivotally mounted braking means in a direction consistent with said governor rope's movement.

3. An elevator governor rope brake assembly, as claimed in claim 2, wherein:

said actuating means comprising a plurality of flyweights, said flyweights capable of extending radially outward beyond said outer circumference of said governor sheave upon said high speed movement of said elevator cab, said flyweights having sufficient length upon extending radially outward to make contact with said pivot arm, thereby actuating said releasable positioning means and releasing said pivotally mounted braking means from said initial position.

4. An elevator governor rope brake assembly, as claimed in claim 1, wherein said pivotally mounted braking means comprising:

(a) a pivot arm having a first end portion and a second end portion;

(b) a rope jaw fastened to said first end portion of said pivot arm with spring loaded fastening means, said rope jaw adapted to grip said governor rope when said governor rope brake assembly engages said governor rope, wherein said spring loaded fastening means is capable of compressing when said rope jaw grips said governor rope; and (c) said second end portion adapted to rotate about a second axis, said second axis positioned to allow said rope jaw to pivot along said first arcuate path and said second arcuate path.

5. In an elevator system, an elevator governor rope brake assembly for slowing governor rope overspeed, said assembly comprising:

(a) a governor sheave over which said governor rope passes, said governor sheave adapted to rotate about a first axis;

(b) a vertically disposed pivot arm having a first end portion and a second end portion;

(c) a braking surface attached to said first end portion of said pivot arm;

(d) said second end portion rotatably attached to a second axis disposed above said first axis, said pivot arm adapted to pivot about said second axis along a first path and along a second path;

(e) means for urging said pivot arm along said first path placing said braking surface in contact with said governor rope to slow said governor rope if said governor rope is overspeeding in a first direction, and for urging said pivot arm along said second path placing said braking surface in contact with said governor rope to slow said governor rope if said governor rope is overspeeding in a second direction.

* * * * *